US011990062B2

(12) United States Patent
Wertz

(10) Patent No.: US 11,990,062 B2
(45) Date of Patent: May 21, 2024

(54) COLLAPSIBLE DISPLAY APPARATUS

(71) Applicant: Andrew Wertz, Bryan, TX (US)

(72) Inventor: Andrew Wertz, Bryan, TX (US)

(73) Assignee: Wertz Werkz, LLC, Bryan, TX (US)

( * ) Notice: Subject to any disclaimer, the term of this patent is extended or adjusted under 35 U.S.C. 154(b) by 174 days.

(21) Appl. No.: 17/548,524

(22) Filed: Dec. 11, 2021

(65) Prior Publication Data

US 2023/0186794 A1 Jun. 15, 2023

(51) Int. Cl.
*G09F 7/18* (2006.01)

(52) U.S. Cl.
CPC ........ *G09F 7/18* (2013.01); *G09F 2007/1843* (2013.01)

(58) Field of Classification Search
CPC .... G09F 2007/1843; G09F 1/065; G09F 1/08; G09F 7/18; B65D 73/0035; B42D 15/04; A47F 5/112
See application file for complete search history.

(56) References Cited

U.S. PATENT DOCUMENTS 1,261,138 A * 4/1918 Lauer ...................... A47F 5/112 248/165
1,854,293 A * 4/1932 Danco ..................... A47F 5/112 211/186
1,934,846 A * 11/1933 Ebert ...................... A47F 5/112 211/189
2,480,731 A * 8/1949 Haughwout .............. A47F 7/06 211/33
2,916,843 A * 12/1959 Meyer .................... A47G 33/06 40/124.4
2,936,144 A * 5/1960 Otis ........................ A47F 5/112 D11/130.1
3,040,459 A * 6/1962 Marcy ..................... A47F 7/143 40/124.4
3,483,742 A * 12/1969 Murray ................... A47F 7/143 40/124.4
3,987,566 A * 10/1976 March ...................... G09F 1/08 229/116
4,209,927 A * 7/1980 Donatelle ................. G09F 7/18 40/607.02
4,315,376 A * 2/1982 Eichenauer ............ A47G 33/06 40/124.4
4,361,314 A * 11/1982 Ohlson ................. E04F 11/181 403/321
4,520,584 A * 6/1985 Howard .............. G09F 15/0056 40/124.19

(Continued)

*Primary Examiner* — David R Dunn
*Assistant Examiner* — Christopher E Veraa
(74) *Attorney, Agent, or Firm* — Patrick K. Steele

(57) ABSTRACT

A collapsible display apparatus comprises a plurality of ribs, each having a first portion with an opening therein, a second portion with an opening therein spaced-apart from the first portion, and an intermediate portion intermediate the first portion and the second portion, a first ring having a slot therein to receive the first portion of each rib to enable the first ring to be received into the opening of the first portion of each rib, and a second ring having a slot therein to receive the second portion of each rib to enable the second ring to be received into the opening of the second portion of each rib. The first ring is secured by a latch to the first portion of each rib and the second ring is secured by a latch to the second portion of each rib.

7 Claims, 6 Drawing Sheets

(56) References Cited

U.S. PATENT DOCUMENTS

| | | | | | |
|---|---|---|---|---|---|
| 5,088,216 | A * | 2/1992 | Wasilko | A47G 7/07 | 40/124.4 |
| 5,911,328 | A * | 6/1999 | Shampo | G09F 1/08 | 40/124.4 |
| 5,979,678 | A * | 11/1999 | Kelly | A47F 7/02 | 211/189 |
| D424,329 | S * | 5/2000 | Lundberg | D6/680.2 | |
| 6,557,278 | B1 * | 5/2003 | Huang | B65D 73/00 | 40/124.19 |
| 7,178,804 | B1 * | 2/2007 | Traylor | A63F 3/00697 | 273/288 |
| 8,112,918 | B1 * | 2/2012 | Crowell | B43M 99/001 | 40/107 |
| 10,235,910 | B1 * | 3/2019 | Graham | G09F 15/0012 | |
| 11,140,979 | B2 * | 10/2021 | Davidson | A47B 47/042 | |
| 2002/0112385 | A1 * | 8/2002 | Wang | G09F 1/08 | 40/540 |
| 2008/0286499 | A1 * | 11/2008 | Spaar | G09F 1/08 | 428/9 |
| 2012/0137550 | A1 * | 6/2012 | Stafford | G09F 7/18 | 40/541 |
| 2017/0287372 | A1 * | 10/2017 | Ashworth | G09F 17/00 | |
| 2018/0268744 | A1 * | 9/2018 | Bloome | G09F 1/06 | |
| 2020/0323174 | A1 * | 10/2020 | Wendling | A01K 39/0113 | |
| 2021/0005113 | A1 * | 1/2021 | Wallen | B42D 15/042 | |
| 2023/0186794 | A1 * | 6/2023 | Wertz | G09F 7/18 | 40/606.12 |

* cited by examiner

COLLAPSIBLE DISPLAY APPARATUS

BACKGROUND

Field of the Invention

The present invention relates to a display apparatus that can be erected to provide a display or to structurally support a display, and later collapsed for efficient storage. The display apparatus may be small, like a display apparatus on a tree, or large, like a large yard or retail display.

Background of the Related Art

Display apparatuses come in many shapes and sizes. Display apparatuses may range from only a few inches in size to many feet in size. Many display apparatuses are inflatable so that they can provide a large display for being shown at, for example, a mall or a parking lot, on top of a building or other large structure, or in the front yard of a house or in the parking lot of a business. Inflatable display apparatuses have the advantage of being deflatable and thereby collapsible to take up very little room for storage as compared to their inflated size. The disadvantage of inflatable display apparatuses is that they require a fan coupled to a power source to remain inflated. Also, inflatable display apparatuses are prone to failure due to punctures or wear, and they are known to be subject to wind displacement or damage.

Other display apparatuses may require a large amount of storage space when not in use. This is a substantial disadvantage considering that the apparatus is often only used for a few days or weeks out of the year in observance of holidays or seasons.

BRIEF SUMMARY

One embodiment of the present invention provides a collapsible display apparatus comprising a plurality of ribs, each rib having a first portion at a first end, a second portion at a second end, an inner edge, and outer edge, and an intermediate portion extending from the first portion to the second portion, an opening through the first portion of each rib, the opening having a slot extending from the opening towards the outer edge of the first portion adjacent to the opening, an opening through the second portion of each rib, the opening having a slot extending from the opening towards the outer edge of the second portion adjacent to the opening, a first slotted ring having a slot therein to receive the inner edge of the first portion of each rib, the first slotted ring being sized for being received into the opening through the first portion of each rib, the first slotted ring also being sized for being received into the slot extending from the opening towards the outer edge of the first portion of each rib and a second slotted ring having a slot therein to receive the inner edge of the second portion of each rib, the second slotted ring being sized for being received into the opening through the second portion of each rib, the second slotted ring also being sized for being received into the slot extending from the opening towards the outer edge of the second portion of each rib wherein after the inner edge of the first portion of each rib is received through the slot of the first ring and the first ring is then received into the opening through the first portion of each rib, and after the inner edge of the second portion of each rib is received through the slot of the second ring and the second ring is then received into the opening through the second portion of each rib, the plurality of ribs can be angularly separated one from the others in an equi-angular pattern by sliding the first portion and the second portion of each rib around the rings after the first ring is then received into the slot extending from the opening in the first portion of each of the ribs, and after the second ring is then received into the slot extending from the opening in the second portion of each of the ribs, the ribs are secured in their equi-angular separation, and wherein first slotted ring is sized for being snugly received into the slot extending from the opening towards the outer edge of the first portion of each rib to prevent unwanted movement of the ring from the slot and wherein the second slotted ring is sized for being snugly received into the ring receptacle within the opening of the first portion and also within the opening of the second portion of each of the plurality of ribs.

The openings and slots in each of the first portion and the second portion of each of the plurality of ribs, the first ring and the second ring together provide a system of latches that, when used and in the latched position with the plurality of ribs, provide for secure and convenient connection of each of the plurality of ribs one to the others and for retaining the plurality of ribs in their positions one relative to the others. The system of latches are easily unlatched for convenient collapse and storage of the collapsible display apparatus. Alternate latches can be used for coupling the first portions of the plurality of ribs one to the others and for coupling the second portions of the plurality of ribs one to the others without departure from the spirit and utility of the collapsible display apparatus of the present invention. The embodiment of the collapsible display apparatus disclosed in the detailed description that follows is particularly convenient because it can be used without the need for fasteners such as screws, pins, clips, nuts and/or additional hardware which can be become lost when the collapsible display apparatus is in the collapsed configuration for storage.

DETAILED DESCRIPTION

Figure 1:
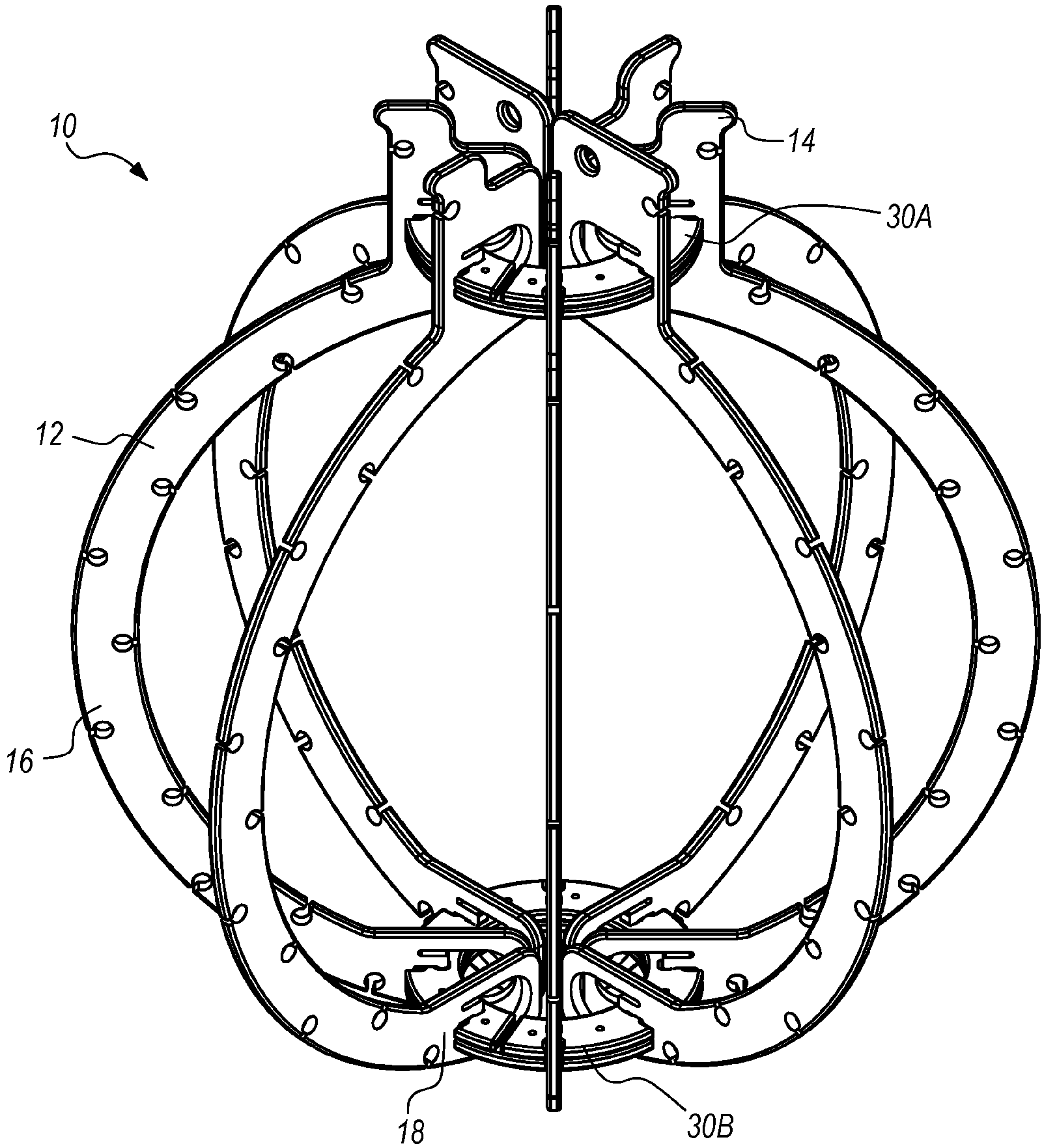
FIG. 1 is a perspective view of an embodiment of a collapsible display apparatus of the present invention.

FIG. 1 is a perspective view of an embodiment of a collapsible display apparatus 10 of the present invention. The embodiment of the collapsible display apparatus 10 shown in FIG. 1 includes a plurality of ribs 12, each rib 12 having a first portion 14, a second portion 18 that is spaced-apart from the first portion 12, and an intermediate portion 16 extending from the first portion 12 to the second portion 18. The embodiment of the collapsible display apparatus 10 of FIG. 1 further includes a pair of rings including a first ring 30A and a second ring 30B. The first ring 30A engages and latches to the first portion 14 of each of the plurality of ribs 12 and a second ring 30B engages and latches to the second portion 18 of each of the plurality of ribs 12. In the assembled, erected and latched configuration of the collapsible display apparatus 10 of FIG. 1, the ribs 12 are supported in a fixed position one relative to the others, with the ribs bowed outwardly and retained in an angularly distributed configuration.

Figure 2:
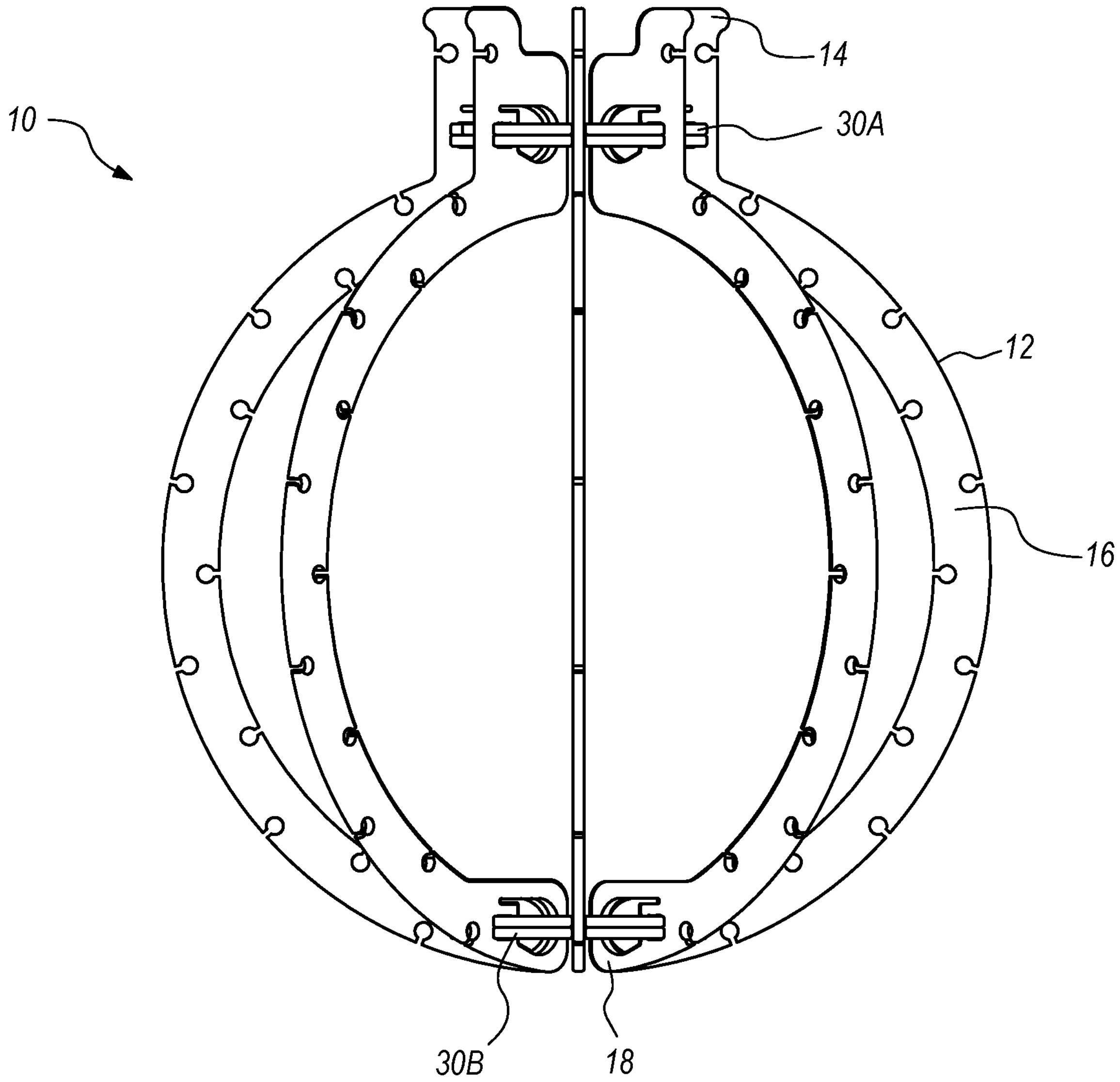
FIG. 2 is an elevation view of the embodiment of the collapsible display apparatus of FIG. 1.

FIG. 2 is an elevation view of the embodiment of the collapsible display apparatus 10 showing the first portions 14 of the plurality of ribs 12 coupled one to the others by first ring 30A and the second portions 18 of each of the plurality of ribs 12 coupled one to the others by second ring 30B. Each rib 12 is angularly separated from adjacent ribs 12. The angle of separation of the ribs 12 in the embodiment of the collapsible display apparatus 10 of FIG. 2 depends on the number of ribs 12. For example, but not by way of limitation, the collapsible display apparatus 10 shown in FIGS. 1 and 2 include eight ribs 12, each of which can be latched to the first ring 30A and the second ring 30B, to retain the ribs 12 in an angularly distributed configuration with an angle of 45 degrees between adjacent ribs 12. Other embodiments of the collapsible display apparatus 10 of the present invention may not be symmetrical, and other embodiments of the collapsible display apparatus 10 of the present invention may not include ribs 12 that are identical one to the others. A wide variety of shapes and configurations of the collapsible display apparatus 10 of the present invention may be created without departure from the spirit and usefulness of the present invention.

Figure 3:
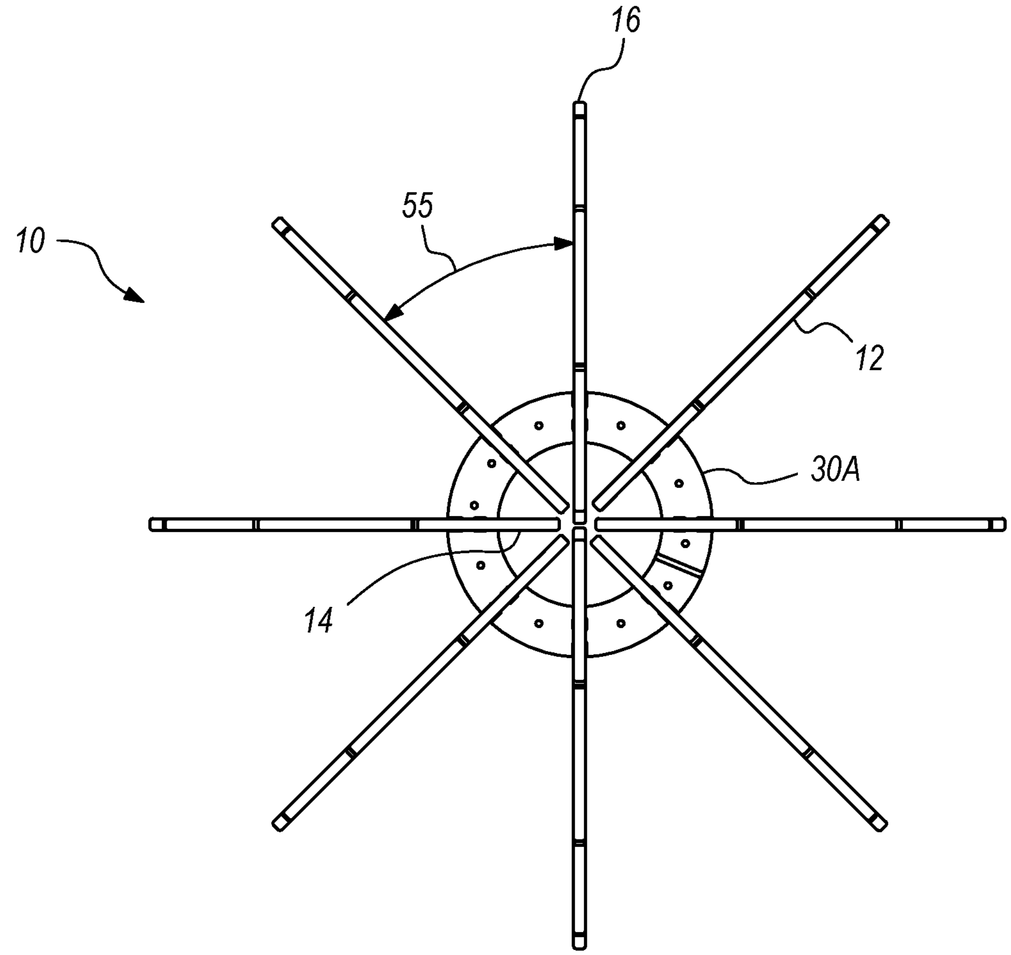
FIG. 3 is a plan view of the embodiment of the collapsible display apparatus of FIG. 1.

FIG. 3 is a plan view of the embodiment of the collapsible display apparatus 10 of FIGS. 1 and 2. FIG. 3 shows how the intermediate portion 16 of each of the plurality of ribs 12 is separated from the intermediate portion 16 of adjacent ribs 12 by an angle 55 of 45 degrees (0.79 radians) and each of the plurality of ribs 12 is held in its angular position relative to the other ribs 12 by the first ring 30A and the second ring 30B (not shown in FIG. 3).

Figure 4:
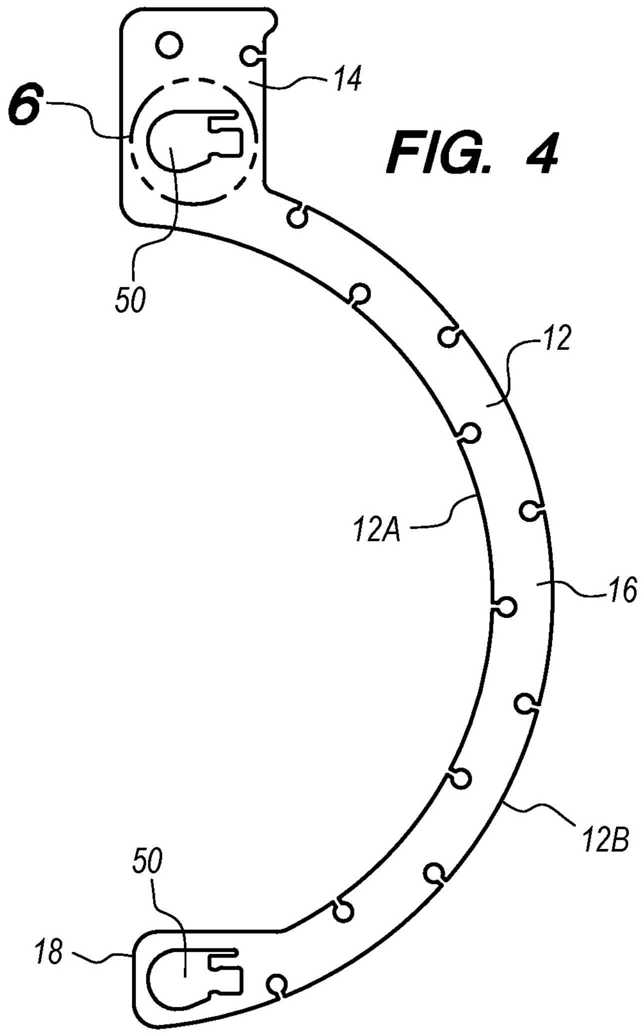
FIG. 4 is an elevational side view of one rib of the embodiment of the collapsible display apparatus of FIG. 1.

FIG. 4 is an elevational side view of one rib 12 of the embodiment of the collapsible display apparatus 10 of FIGS. 1 and 2. The rib 12 of FIG. 4 includes a first portion 14 having an opening 50 therein, a second portion 18 having a ring receptacle 50 therein, and an intermediate portion 16 intermediate the first portion 14 and the second portion 18 of the rib 12. The rib 12 of FIG. 4 has an inner edge 12A and an outer edge 12B.

Figure 5:
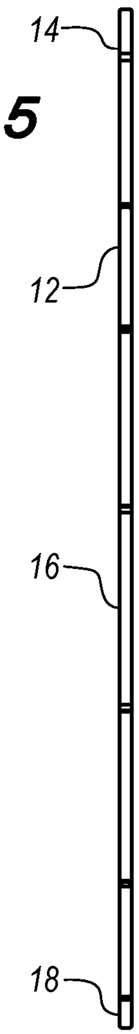
FIG. 5 is an elevational edge view of the rib of the embodiment of the collapsible display apparatus of FIG. 4.

FIG. 5 is an elevational edge view of the rib 12 of the embodiment of the collapsible display apparatus 10 of FIGS. 1 and 2. The rib 12 of FIG. 5 includes a first portion 14, a second portion 18 spaced-apart from the first portion 14, and an intermediate portion 16 disposed intermediate the first portion 14 and the second portion 18.

Figure 6:
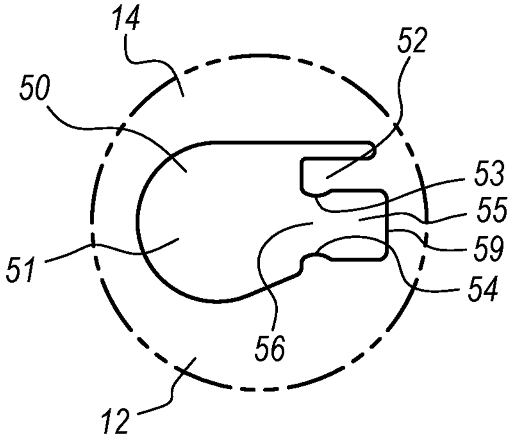
FIG. 6 is an enlarged view of a ring receptacle of a top end of the rib of the embodiment of the collapsible display apparatus shown in FIG. 4.

FIG. 6 is an enlarged view of an opening 50 of a first portion 14 (or the second portion 18) of the rib 12 of the embodiment of the collapsible display apparatus 10 shown in FIG. 4. The opening 50 shown in FIG. 6 includes a main portion 51 and a slot 55 extending from the main portion 51 of the opening 50 towards the outer edge 12B (not shown in FIG. 6) having a mouth 56 open to the main portion 51. On opposite sides of the mouth 56 are retainers 53 and 54. Retainer 53 is disposed on an arm 52 that can be elastically deformed to separate the retainer 53 from the retainer 54 to open the mouth 56 and to thereby allow introduction of the first ring 30A (or the second ring 30B) into the slot 55 a sufficient amount to allow the retainers 53 and 54 to seat in a retainer seat 36 (not shown) in the first ring 30A (not shown). The slot 55, the retainers 53 and 54 and retainer seats 36 of the first portion 14 and the second portion 18 formed in the first ring 30A and the second ring 30B form a latch for securing the first portions 14 of the plurality of ribs 12 to the first ring 30A and for securing the second portions 18 of the plurality of ribs 12 to the second ring 30B, as will be discussed below.

Figure 7:
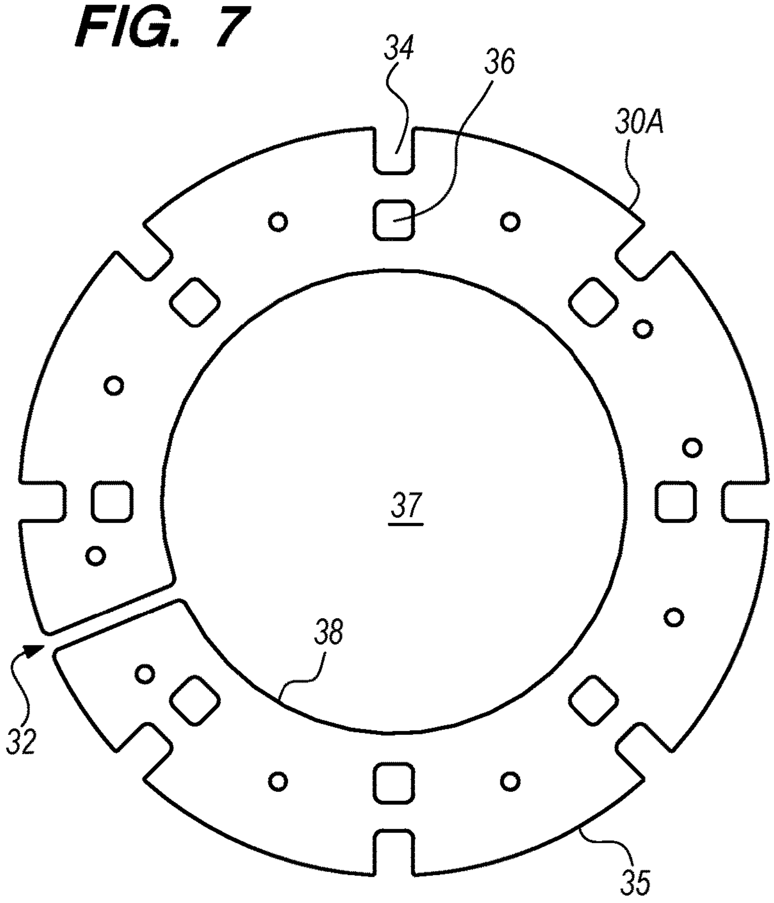
FIG. 7 is a plan view of one of the rings of the embodiment of the collapsible display apparatus of FIG. 1.

FIG. 7 is a plan view of one of the first ring 30A of the embodiment of the collapsible display apparatus 10 of FIG. 1. The first ring 30A of FIG. 7 has a ring slot 32 for receiving the first portion 14 of each of the plurality of ribs 12. FIG. 7 further shows the plurality of retainer seats 36 of the first ring 30A that cooperates with the retainers 53 and 54 that form the mouth 56 of the slot 55 extending from the main portion 51 of the opening 55, to form a latch for securing the first portions 14 of the plurality of ribs 12 one to the others as will be discussed below in relation to FIG. 9. Upon introduction of the first ring 30A into the mouth 56 of the slot 55 of the opening 50, the retainers 53 and 54 elastically separate one from the other by elastic deformation of the arm 52 to allow entry of the first ring 30A into the slot 55, and the retainers 53 and 54 then elastically restore towards their original positions as the retainers 53 and 54 seat within the retainer seats 36 in the first ring 30. In the embodiment shown in FIG. 7, the first ring 30A may further include a receptacle 34 within an outer periphery 35 of the first ring 30A to receive and abut a slot wall 59 (see FIG. 6) of the slot 55 extending from the opening 50 of the first portion 14 to position the retainers 53 and 54 into alignment and seated engagement with the retainer seats 36 of the first ring 30A. A center bore 37 of the first ring 30A surrounded by bore wall 38 may be included for receiving a display component (not shown) or simply for reducing weight and material consumed.

It will be understood that the second ring 30A may be identical in structure to the first ring 30A and that it similarly cooperates with the openings 50, the main portions 51, the mouths 56, the slots 55 and the retainers 53 and 54 forming the mouths 56 in the second portion 18 of each of the plurality of ribs 12 for latching of the second portions 18 of the ribs 12 to the second ring 30B. In some embodiments of the collapsible display apparatus 10 of the present invention, the first ring 30A and the second ring 30B are identical and interchangeable. The first ring 30A and the second ring 30B are ring latch members. Ring latch members may be coupled to one of the first portion 14 and the second portion 18 of the plurality of ribs 12. The first portion 14 of each of the plurality of ribs 12 includes the slot 55 extending from the opening 50, and the retainers 53 and 54, and these together provide a rib latch member. Similarly, the second portion 18 of each of the plurality of ribs 12 includes the slot 55 extending from the opening 50, and the retainers 53 and 54, and these together also provide a rib latch member. A ring latch member and a rib latch member together form a latch, and the latch may be open by decoupling the ring latch member from the rib latch member and the latch may be closed by coupling the ring latch member to the rib latch member.

Other latches that can be used in embodiments of the collapsible display apparatus of the present invention to secure the first portion 14 of a rib 12 to a ring latch member, or that can be used to secure the second portion 18 of a rib 12 to a ring latch member, include a hook and loop latch, a cam latch, a compression latch, a push-to-close latch, a draw latch and a sliding latch. The latch shown in FIGS. 1-9 of the appended drawings is favored due to the minimization of the number of components, minimization of material required and convenience of closing and opening the latch to couple and decouple a rib 12 first portion 14 (or second portion 14) to or from the ring latch member, respectively.

Figure 8:
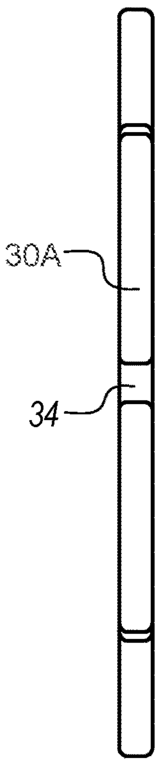
FIG. 8 is an edge view of the ring of FIG. 7.

FIG. 8 is an edge view of the first ring 30A of FIG. 7. The first ring 30A of FIG. 8 includes a plurality of angularly distributed receptacles 34 distributed along the periphery of the first ring 30A. Each of the plurality of receptacles 34 engages the slot wall 59 (see FIG. 6) of the slot 55 upon the first ring 30A being received through the mouth 56 and into the slot 55. Upon full engagement of the receptacle 34 of the first ring 30A with the slot 55 of the first portion 14 of the rib 12, the retainers 53 and 54 (see FIG. 6) that straddle and form the mouth 56 are in alignment with the retainer seat 36 and the arm 52 will be elastically restored to its original position to secure the first portion 14 of the rib 12 to the first ring 30A. Similarly, FIG. 8 is an edge view of the second ring 30B of FIG. 7. The second ring 30B of FIG. 8 includes a plurality of angularly distributed receptacles 34 distributed along the periphery of the second ring 30B. Each of the plurality of receptacles 34 engages the slot wall 59 (see FIG. 6) of the slot 55 upon the second ring 30B being received through the mouth 56 and into the slot 55. Upon full engagement of the receptacle 34 of the second ring 30B with the slot 55 of the second portion 18 of the rib 12, the retainers 53 and 54 (see FIG. 6) that straddle and form the mouth 56 are in alignment with the retainer seat 36 and the arm 52 will be elastically restored to its original position to secure the second portion 18 of the rib 12 to the second ring 30B.

Figure 9:
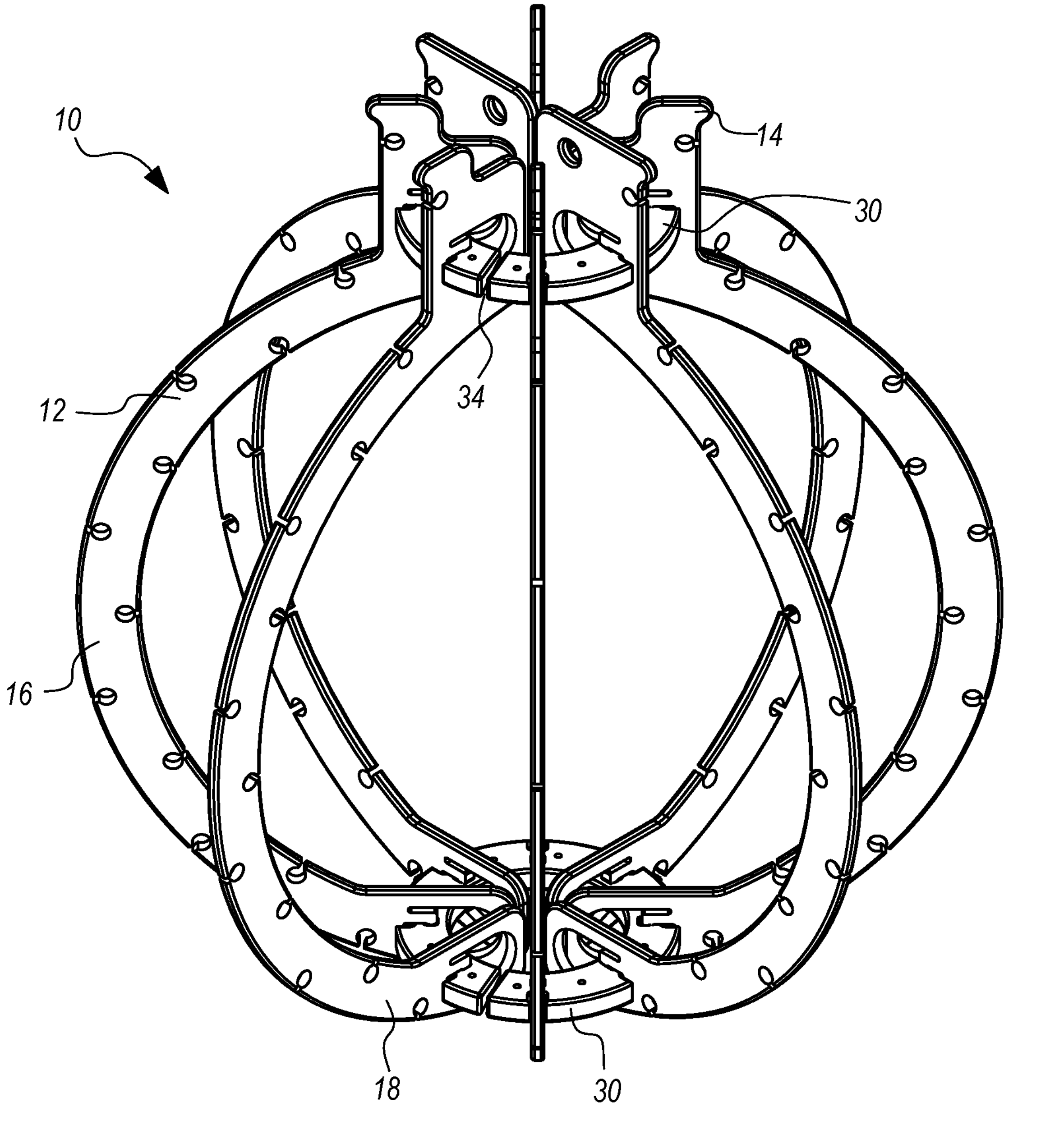
FIG. 9 is a perspective view of an embodiment of the collapsible display apparatus erected using the components shown in FIGS. 2-8.

FIG. 9 is a perspective view of an embodiment of the collapsible display apparatus 10 of the present invention after full assembly. FIG. 9 shows the collapsible display apparatus 10 of FIG. 9 comprises a plurality of ribs 12, each rib 12 having a first portion 14 and a second portion 18, spaced apart from the first portion 14, and an intermediate portion 16 therebetween. The first portion 14 of each of the plurality of ribs 12 is received, one at a time, into the slot 32 of the first ring 30A to align the opening 50 of the first portion 14 of the rib 12 with the first ring 30A. As the first portion 14 of each rib 12 is introduced into the slot 34, the first ring 30A can then be rotated to secure the first portion 14 to the first ring 30A and to align the slot 32 to receive another first portion 14 of another of the plurality of ribs 12 until all of the plurality of ribs 12 are received onto the first ring 30A. It will be understood that the second ring 30B is received within the opening 50 of the second portion 18 of each of the plurality of ribs 12 in the same manner. Each of the first portions 14 of each of the plurality of ribs 12 can then be coupled to the first ring 30A by closing the latch formed by the ring latch member and the rib latch member of the first portion 14 of each of the plurality of ribs 12. Similarly, the second portion 18 of each of the plurality of ribs 12 is received, one at a time, into the slot 32 of the second ring 30B to align the opening 50 of the second portion 18 of the rib 12 with the second first ring 30B. As the second portion 18 of each rib 12 is introduced into the slot 32, the second ring 30B can then be rotated to secure the first portion 14 to the first ring 30A and to align the slot 32 to receive another second portion 18 of another of the plurality of ribs 12 until all of the plurality of ribs 12 are received onto the second ring 30B. Each of the second portions 18 of each of the plurality of ribs 12 can then be coupled to the second ring 30B by closing the latch formed by the ring latch member and the rib latch member of the second portion 18 of each of the plurality of ribs 12.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A collapsible display apparatus, comprising:

a plurality of ribs, each rib having a first portion at a first end, a second portion at a second end, an inner edge, an outer edge, and an intermediate portion extending from the first portion to the second portion;

an opening through the first portion of each rib, the opening having a slot extending from the opening towards the outer edge of the first portion adjacent to the opening;

an opening through the second portion of each rib, the opening having a slot extending from the opening towards the outer edge of the second portion adjacent to the opening;

a first ring having a slot therein to receive the first portion of each of the plurality of ribs, the first ring being sized for being received into the opening through the first portion of each of the plurality of ribs, the first ring also being sized for being received into the slot extending from the opening towards the outer edge of the first portion of each of the plurality of ribs; and a second ring having a slot therein to receive the second portion of each plurality of ribs, the second ring being sized for being received into the opening through the second portion of each of the plurality of ribs, the second ring also being sized for being received into the slot extending from the opening towards the outer edge of the second portion of each of the plurality of ribs;

wherein after the inner edge of the first portion of each rib is received through the slot of the first ring and the first ring is then received into the opening through the first portion of each of the plurality of ribs, and after the inner edge of the second portion of each of the plurality of ribs is received through the slot of the second ring and the second ring is then received into the opening through the second portion of each of the plurality of ribs, the plurality of ribs can be angularly separated one from the others by sliding the first portion and the second portion of each of the plurality of ribs along the first ring and the second ring, respectively, to a desired location.

2. The collapsible display apparatus of claim 1, wherein first ring is sized for being snugly received into the slot extending from the opening towards the outer edge of the first portion of each of the plurality of ribs to prevent unwanted movement of the first ring from the slot; and wherein the second ring is sized for being snugly received into the slot extending from the opening towards the outer edge of the second portion of each of the plurality of ribs to prevent unwanted movement of the second ring from the slot.

3. The collapsible display apparatus of claim 2, further comprising:

an elastically deformable arm extending along the slot that extends from the opening in the first portion of each of the plurality of ribs, the arm having a retainer thereon that protrudes into the slot.

4. The collapsible display apparatus of claim 3, further comprising a retainer seat in the first ring to align with and engage the retainer of the arm upon movement of the first ring into the slot extending from the opening in the first portion of the plurality of ribs.

5. The collapsible display apparatus of claim 4, further comprising a retainer protruding into the slot extending from the opening in the first portion of each of the plurality of ribs, the retainer opposite the arm and in alignment with the retainer on the arm to seat within the retainer seat of the first ring simultaneously with the seating of the retainer on the arm within the seat retainer.

6. The collapsible display apparatus of claim 5, further comprising a slot wall at a terminus of the slot extending from the opening in the first end of each of the plurality of ribs.

7. The collapsible display apparatus of claim 6, further comprising a plurality of receptacles distributed about the periphery of the first ring, each sized to receive the slot wall at the terminus of the slot extending from the opening in the first portion of one of the plurality of ribs.

* * * * *